March 20, 1956  J. S. ALFORD  2,738,644
SURGE CONTROL FOR AXIAL FLOW COMPRESSORS
Filed April 15, 1950  2 Sheets-Sheet 1
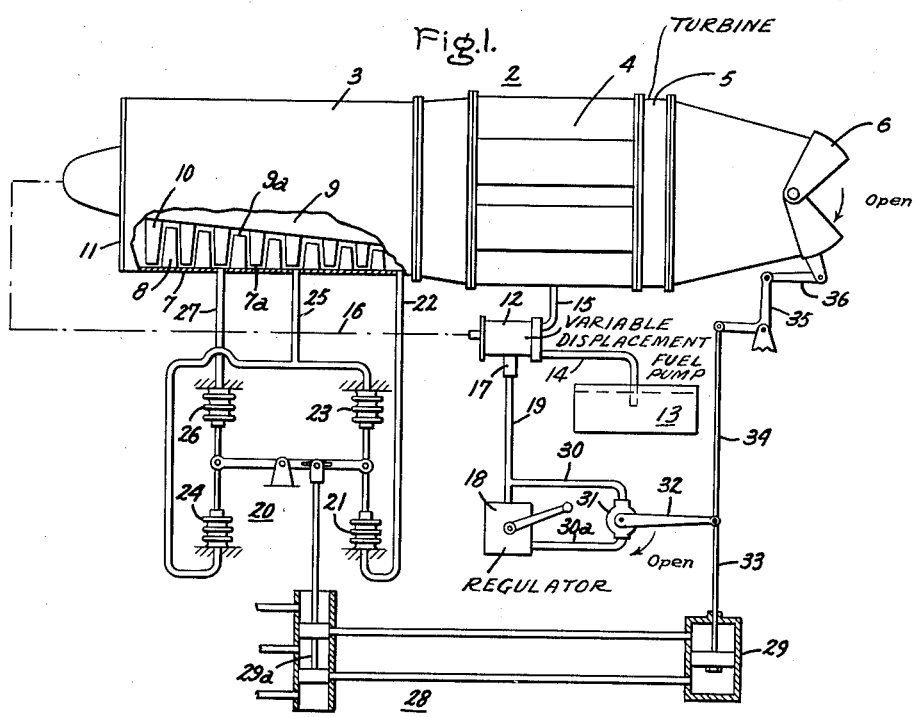
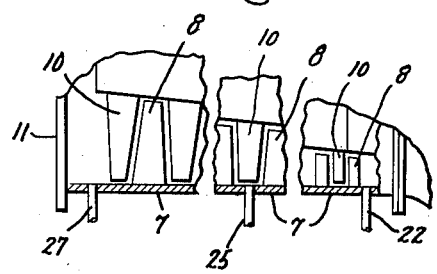
Inventor:
Joseph S. Alford,
by Ernest C. Britton
His Attorney.

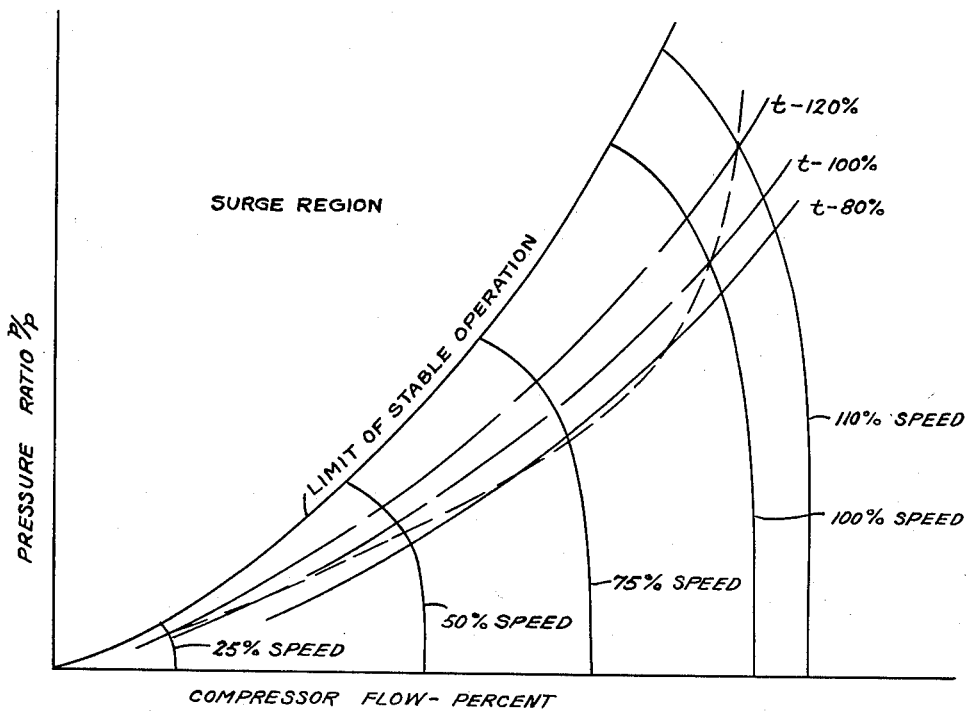

United States Patent Office 2,738,644
Patented Mar. 20, 1956

2,738,644

SURGE CONTROL FOR AXIAL FLOW COMPRESSORS

Joseph S. Alford, Nahant, Mass., assignor to General Electric Company, a corporation of New York Application April 15, 1950, Serial No. 156,080

10 Claims. (Cl. 60—35.6)

This invention relates to gas turbine power plants and more particularly to control means for preventing surging of the compressor in such a power plant.

The flow range of a compressor, particularly of the axial flow type, is limited by surge conditions, that is, by stalling occurring at a higher pressure and a lower flow than normal for a given operating speed. In a constant speed compressor, surging may be avoided by bleeding a portion of the compressor flow through a by-pass valve arranged to open at a predetermined compressor discharge pressure. While the speed of a compressor may be varied to vary the flow in accordance with the demand, the problem of avoiding stalling or surging is more difficult for the reason that a bleeder or by-pass valve operating only in response to compressor discharge pressure does not suffice. In a gas turbine power plant the problem is further complicated because the turbine operating conditions have a marked effect upon the compressor operation. For example, acceleration of such a power plant from one rotational speed to another is effected by causing the turbine inlet temperature to increase. Usually the turbine diaphragm area is fixed so that any tendency to increase the rate of volume flow as a result of an increase in turbine inlet temperature is balanced either by an increase in the compressor discharge pressure, or by a decrease in the rate of weight flow. Actually both compensating effects occur together, although in power plants employing an axial flow compressor the major response is the rise in compressor discharge pressure or turbine inlet pressure. There is, of course, an upper limit to the pressure rise which can be produced at a given rotational speed. This upper limit is commonly known as the stall or surge limit, and is descriptive of the rapid reversals of flow which occur within the compressor when this operating condition is reached.

Accordingly, it is an object of the invention to provide means for obviating the above-mentioned difficulties.

A further object is to provide a control device for automatically preventing operation of a gas turbine power plant under surging conditions.

Another object is in the provision of a gas turbine power plant having an improved acceleration characteristic, that is, a power plant that can be accelerated from one rotational speed to another in a shorter interval of time.

Another object is in the provision of gas turbine power plant apparatus wherein the rate at which fuel is supplied to the power plant is varied as the surge condition is approached.

Still another object is in the provision of an improved control apparatus for a gas turbine power plant for overriding normal power plant controls to vary turbine operating conditions automatically as the compressor approaches a surge condition.

Other objects and advantages will be apparent from the following description taken in connection with the accompanying drawings in which Fig. 1 is a view, partly in section, diagrammatically illustrating a gas turbine power plant provided with surge control apparatus in accordance with the invention; Fig. 2 is an enlarged detail view, partly in section, showing a portion of the compressor flow passage and illustrating a modified arrangement for sensing compressor pressures; Fig. 3 is a diagram illustrating compressor and turbine operating conditions.

Referring now to Fig. 1, a gas turbine power plant for the propulsion of aircraft is indicated generally at 2. Such a power plant may comprise a compressor 3 for furnishing a supply of compressed air to combustion apparatus 4. Fuel is added to the air under pressure and burned in the combustion apparatus to produce high temperature motive fluid under pressure for driving a turbine 5. At least sufficient power is extracted from the motive fluid by the turbine 5 to drive the compressor 3, and the remaining power is utilized to expel the motive fluid through a propulsion nozzle 6 at high velocity. For various reasons not essential to an understanding of the present invention, nozzle 6 may be of a variable area type as illustrated in the drawing. The structural details of such a power plant are described with greater particularity in a copending application of Alan Howard, Serial No. 541,565, filed June 22, 1944, now U. S. Patent No. 2,711,074 issued June 21, 1955, and assigned to the assignee of the present application.

As illustrated, the compressor 3 is of the multi-stage axial flow type comprising a stator 7 to which are secured a plurality of axially spaced rows of stationary blades 8. A rotor 9 is rotatably supported by suitable bearings (not shown) and carries a plurality of axially spaced rows of moving blades 10 disposed between adjacent rows of stationary blades 8. Surfaces 7a, 9a of the stator and rotor respectively define a compressor flow path extending in the embodiment shown from approximately the axial width of one stage before the first compressor stage to approximately the axial width of one stage after the last compressor stage or, in other words, a path that starts slightly before the first stage and extends slightly beyond the last stage. In this slight axial distance before the inlet and after the outlet, the pressure and velocity changes are negligible or the same as at the inlet and outlet respectively. The compressor flow path therefore may extend beyond the last stage as far as the pressure and velocity are the same as at the exit from the stationary straightening vanes. Air is admitted to this passage from the atmosphere through an inlet 11, is compressed, and then is discharged to the combustion apparatus 4 which forms a conduit for the fluid.

A fuel pump 12 is provided for conveying fuel under pressure to the power plant from a reservoir 13 through connecting conduits 14—15. As indicated by line 16, pump 12 is connected to the power plant 2 and is driven thereby. As illustrated in the drawing, pump 12 is of the variable displacement type having a displacement control device 17 associatd therewith for varying the displacement of pump 12 in response to a variable control pressure. A pump of this type and its associated displacement control device are described in greater detail in a copending application of D. E. Garr and M. A. Edwards, Serial No. 718,580, filed December 26, 1946, now U. S. Patent No. 2,709,449 issued May 31, 1955. A regulator 18 is provided for supplying a variable control pressure to the displacement control device 17 through conduit 19. Preferably regulator 18 is of the type which produces a variable control pressure output in response to a plurality of power plane operating conditions such as ambient pressure, temperature, speed and load in accordance with a predetermined schedule. Such a regulator is described in a copending application of M. A. Edwards, D. E. Garr and H. M. Ogle, Serial No. 605,960, filed July 19, 1945, now U. S. Patent No. 2,622,393 issued December 23, 1952, and assigned to the assignee of the present application.

I have discovered and verified by experiment that when the surging limit is approached at any specific speed, Fig. 3, the ratio of the pressure rise across the latter stages of the compressor to the pressure rise across a group of earlier stages increases. In addition, experiments indicate that this ratio is approximately constant at the limit of stable operation; that is, the ratio is relatively independent of compressor operating conditions, such as the temperature of the inlet air, and pressure of the inlet air.

As previously indicated, when the turbine inlet temperature is increased at any given speed of operation, the compressor approaches a condition of unstable operation for a given operating condition, and, conversely, as the turbine inlet temperature is decreased the compressor moves away from the limit of stable operation, as will be apparent from examination of Fig. 3. I employ the principle of the above-mentioned discovery as a means for limiting the rate of fuel flow to the power plant when the compressor approaches unstable operation or a surge condition. This is accomplished in accordance with the invention by the provision of a bellows system indicated generally at 20 for sensing the difference in pressure across the latter stages of the compressor and for comparing this pressure rise to that across a group of earlier compressor stages.

As illustrated in Fig. 1, a bellows 21 is provided for sensing compressor discharge pressure through a sensing conduit 22. Bellows 23, 24 are arranged to sense an intermediate pressure less than the compressor discharge pressure through a sensing conduit 25. Bellows 26 senses a still lower pressure through conduit 27 at a location upstream from conduit 25. The pressure sensing system 20 is connected to a servomotor indicated generally at 28 and having an operating piston 29. Such a servomotor and sensing means are described with greater particularity in United States Patent No. 2,409,837—Alford.

Connection is then established between the power plant fuel system and the servomotor by the provision of a branch conduit 30 having a valve 31 therein and connected to piston 29 by a lever 32 and piston rod 33. For reasons which will appear presently, piston rod 33 is also connected to the variable nozzle and linkage members 34—36.

As described in the above-mentioned copending patent of M. A. Edwards, D. E. Garr and H. M. Ogle, a control oil reservoir and pump (not shown) are provided within regulator 18. Conduit portion 30a is arranged to by-pass the control oil pump, that is, to establish connection between the discharge of the control oil pump and the control oil reservoir so as to decrease the value of the control oil pressure when valve 31 is in an open position.

In operation, as the compressor approaches the limit of stable operation, as indicated in Fig. 3, the difference between the pressure sensed by conduit 22 and that sensed by conduit 25 will exceed the difference between the pressure sensed by conduit 25 and that sensed by conduit 27, as previously indicated. This excess in pressure across the latter stages of the compressor causes an upward motion of pilot valve 29a which results in a downward motion of piston 29 and piston rod 33. This downward motion of rod 33 produces a clockwise rotation of lever 32, thus opening valve 31. When valve 31 is opened a portion of the control oil merely circulates through the control oil pump in regulator 18, conduit 30, and valve 31, and is returned to the control oil reservoir within regulator 18. It will be apparent that by-passing or circulating a portion of the control oil through such a circuit will decrease the value of the control oil pressure supplied to the displacement control device 17 to a value less than that called for by regulator 18 in response to the previously mentioned schedule of power plant operating conditions and thus reduces the rate of fuel flow supplied to the power plant. It will be apparent to those skilled in the art that a reduction in the rate of fuel flow supplied to the power plant will result in a decreased value of turbine inlet temperature so that the compressor is automatically caused to operate under more stable conditions. It should be noted that regulation of the fuel and/or cross-sectional area of nozzle 6 are two of the powerplant controls that are effective to initiate corrective action and are merely illustrative and preferred controls.

In addition, a downward motion of rod 33 causes nozzle 6 to open or increase the effective area thereof, which reduces the turbine exhaust pressure. A reduction in the turbine exhaust pressure increases the available energy of the turbine for a given turbine inlet temperature so that the turbine will still supply sufficient energy to drive the compressor at constant speed with the decreased fuel flow, or will cause the compressor to accelerate to a higher rotational speed more rapidly and with turbine inlet temperatures less than those otherwise required for such acceleration.

With the arrangement shown in Fig. 2, conduit 27 is arranged to sense compressor inlet pressure instead of merely a pressure less than that sensed by conduit 25. In all other respects the arrangement of elements as shown in Fig. 2 and operation thereof are in accordance with that of Fig. 1.

While a particular embodiment of the invention has been illustrated and described, it will be obvious to those skilled in the art that various changes and modifications may be made without departing from the invention, and it is intended to cover in the appended claims all such changes and modifications as come within the true spirit and scope of the invention.

What I claim as new and desire to secure by Letters Patent of the United States is:

1. Surge control apparatus for a gas turbine powerplant comprising a multistage compressor, means including a member for varying one or more of the powerplant controls, means for sensing at least three pressure signals at different locations within the compressor flow path, one of said sensing means being positioned within the compressor, operating means connected to the member for effecting movements of said member in response to said three pressure signals, and means for establishing communication between said operating means and said sensing means.

2. Surge control apparatus for a gas turbine powerplant comprising a multistage axial flow compressor, means including a member for effecting changes in one or more of the operating controls of the powerplant, first means for sensing the compressor discharge pressure, second means for sensing an intermediate pressure in the compressor flow path, and third means at a location upstream from said second sensing means for sensing another pressure in the compressor flow path, motor means for effecting movements of said member in response to said three different pressure signals, and means for establishing communication between the motor means and each of said sensing means.

3. Apparatus in accordance with claim 2 wherein said third pressure sensing means is located at the inlet of the compressor flow path and said motor means is operative only when the ratio of the difference between the compressor discharge pressure and the intermediate pressure to the difference between the intermediate pressure and the compressor inlet pressure increases to a preselected value.

4. Surge control apparatus for a gas turbine powerplant comprising a multistage axial flow compressor, fuel supply means including a first regulator for supplying fuel to the powerplant at a variable rate and in accordance with a preselected schedule of powerplant operating conditions, a second regulator including a control member for modulating the rate of fuel supply established by the first regulator, means for sensing at least three pressure signals at different locations within the compressor flow path, one of said sensing means being positioned within the compressor, motor means for effecting movements of said control member in response to said three different pressure signals, and means for establishing communication between the motor means and said sensing means.

5. Surge control apparatus for a gas turbine powerplant, comprising a multistage axial flow compressor, first means for sensing the discharge pressure of the compressor, second means for sensing an intermediate pressure in the compressor flow path, third means at the inlet of the compressor flow path for sensing compressor inlet pressure, fuel supply means including a first regulator having a first control member for supplying fuel to the powerplant at a variable rate and in accordance with a preselected schedule of powerplant operating conditions, a second regulator including a second control member for modulating the rate of fuel flow established by the first regulator, motor means responsive to the difference between the compressor discharge pressure and said intermediate pressure and also responsive to the difference between said intermediate pressure and the compressor inlet pressure for effecting movements of said second control member, and means for establishing fluid communication between the motor means and each of said sensing means.

6. Surge control apparatus for a gas turbine powerplant comprising a multistage axial flow compressor, first means for sensing the discharge pressure of the compressor, second means for sensing an intermediate pressure in the compressor flow path, third means at a location upstream from said second sensing means for sensing another pressure in the compressor flow path, fuel supply means including a first regulator having a first control member for supplying fuel to the powerplant at a variable rate and in accordance with a preselected schedule of powerplant operating conditions, a second regulator including a second control member for modulating the rate of fuel flow established by the first regulator, motor means for effecting movements of said second control member in a direction to reduce the rate of fuel flow when the ratio of the difference between compressor discharge pressure and the intermediate pressure to the difference between the intermediate pressure and the pressure sensed by the third sensing means increases to a preselected value, and means for establishing fluid communication between the motor means and each of said sensing means.

7. Control apparatus for a gas turbine powerplant comprising a multistage axial flow compressor, means for sensing at least three pressure signals at different locations within the compressor flow path, one of said sensing means being positioned within the compressor, a turbine having an exhaust passage, means including a conduit connecting the turbine inlet to the compressor discharge, means including a control member for varying the effective flow area of the turbine exhaust passage, motor means responsive to said three different pressure signals for effecting movements of said member, and means establishing fluid communication between said motor means and said sensing means.

8. Apparatus in accordance with claim 7 wherein said sensing means includes first means for sensing compressor discharge pressure, second means for sensing an intermediate pressure in the compressor flow path, and third means for sensing compressor inlet pressure, and said motor means is responsive to the difference between compressor discharge pressure and the intermediate pressure and also responsive to the difference between said intermediate pressure and the compressor inlet pressure.

9. Surge control apparatus for a gas turbine powerplant comprising a multistage axial flow compressor, means for sensing pressure signals at the discharge end of the compressor flow path, second means for sensing pressure at an intermediate location in the compressor flow path, third means at a location upstream from said second sensing means for sensing another pressure in the compressor flow path, a turbine having an exhaust passage, means including a conduit connecting the turbine inlet to the compressor discharge, fuel supply means including a first regulator having a first control member for supplying fuel to the powerplant at a variable rate and in accordance with a preselected schedule of powerplant operating conditions, a second regulator including a second control member for modulating the rate of fuel flow established by the first regulator, means including a third control member for varying the effective flow area of the turbine exhaust passage, motor means connected to said second and third control members for effecting movements thereof in response to the difference between the compressor discharge pressure and the intermediate pressure and also in response to the difference between the intermediate pressure and the pressure sensed by said third sensing means, and means for establishing communication between the motor means and each of said sensing means.

10. Apparatus in accordance with claim 9 wherein said motor means is operative to move said second control member in a direction to reduce the rate of fuel flow and to move said third control member in a direction to increase the effective flow area when the ratio of the difference between compressor discharge pressure and the intermediate pressure to the difference between the intermediate pressure and the pressure sensed by said third sensing means reaches a preselected value.

References Cited in the file of this patent

UNITED STATES PATENTS

| | | |
|---|---|---|
| 2,409,837 | Alford | Oct. 22, 1946 |
| 2,411,895 | Poole | Dec. 3, 1946 |
| 2,514,248 | Lombard | July 4, 1950 |
| 2,520,434 | Robson | Aug. 29, 1950 |
| 2,540,594 | Price | Feb. 6, 1951 |
| 2,545,703 | Orr | Mar. 20, 1951 |
| 2,623,352 | Sédille et al. | Dec. 30, 1952 |
| 2,643,514 | Jubb | June 20, 1953 |
| 2,677,233 | Jordan | May 4, 1954 |
| 2,688,841 | Decher et al. | Sept. 14, 1954 |
| 2,688,844 | McLeod et al. | Sept. 14, 1954 |

FOREIGN PATENTS

| | | |
|---|---|---|
| 587,558 | Great Britain | May 7, 1947 |
| 612,414 | Great Britain | Nov. 12, 1948 |
| | (corresponding U. S. # 2,688,844) | |
| 941,556 | France | July 19, 1948 |
| | (corresponding U. S. # 2,688,841) | |